United States Patent [19]

Nishizawa et al.

[11] 4,292,334

[45] Sep. 29, 1981

[54] PROCESS FOR PUFFING FEATHER OR ANIMAL FUR

[75] Inventors: Yoshihiko Nishizawa; Yoshihiro Aketa, both of Noda; Takeshi Akao, Abiko, all of Japan

[73] Assignee: Kikkoman Shoyu Co., Ltd., Noda, Japan

[21] Appl. No.: 113,977

[22] Filed: Jan. 21, 1980

Related U.S. Application Data

[63] Continuation of Ser. No. 948,797, Oct. 5, 1978, abandoned.

[51] Int. Cl.³ ............................................. A23L 1/18
[52] U.S. Cl. ...................................... 426/447; 71/18; 426/807; 426/445
[58] Field of Search .............. 426/445, 447, 656, 657, 426/635, 1, 807; 71/18; 260/123.7

[56] References Cited

U.S. PATENT DOCUMENTS

| | | | |
|---|---|---|---|
| 2,327,698 | 8/1943 | Creely et al. | 426/807 |
| 2,702,245 | 2/1955 | Mayer | 71/18 |
| 3,667,961 | 6/1972 | Algeo | 426/447 |

FOREIGN PATENT DOCUMENTS 52-39573  3/1977  Japan .

OTHER PUBLICATIONS

Morrison, *Feeds and Feeding,* "Feather meal", p. 524, 1957.
Gillies, *Animal Feeds From Waste Materials,* pp. 67–75 and 253–254, 1978.

*Primary Examiner*—Joseph M. Golian
*Assistant Examiner*—George C. Yeung
*Attorney, Agent, or Firm*—Schuyler, Banner, Birch, McKie & Beckett

[57] ABSTRACT

Here is provided a process for treating feather or animal fur characterized by throwing feather or animal fur into a pressure-resistant vessel, directly heating it under an elevated pressure by means of saturated steam or superheated steam, then rapidly discharging it into an atmosphere of lower pressure to puff it, and drying and cooling it if necessary. The feather or animal fur thus treated can be crushed without difficulty. It can be utilized effectively as a feed for domestic animals in the form of a mixture with other feeds or as a nitrogen source fertilizer.

2 Claims, 1 Drawing Figure

U.S. Patent  Sep. 29, 1981  4,292,334
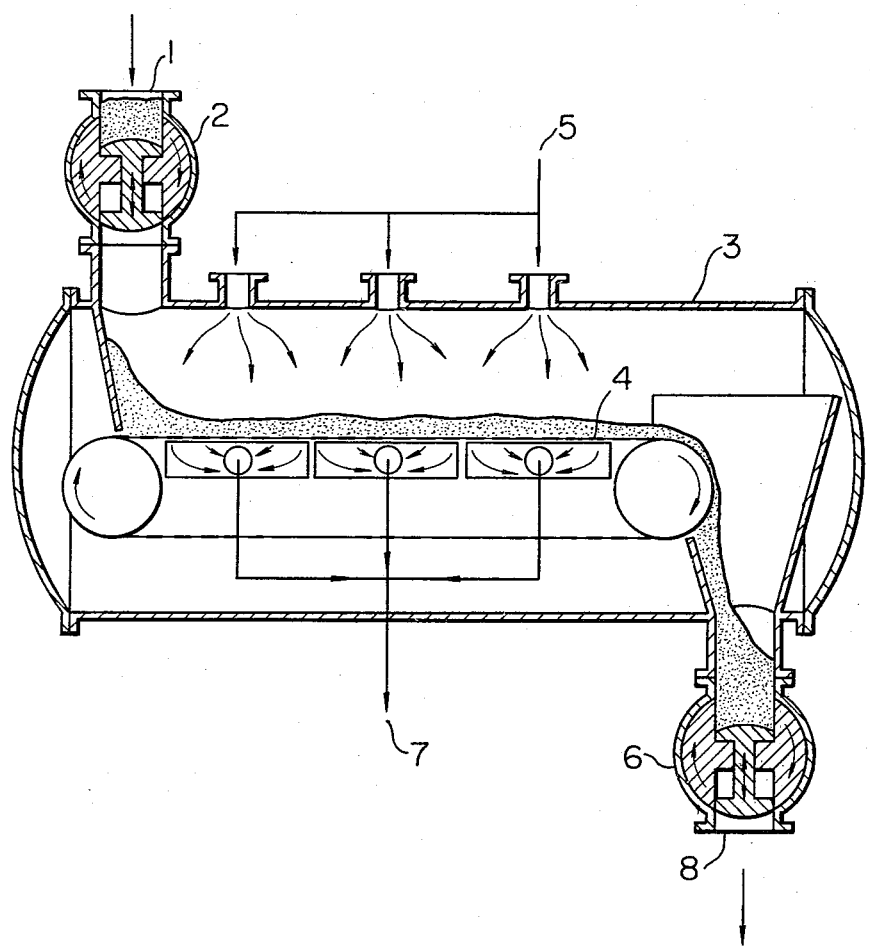

PROCESS FOR PUFFING FEATHER OR ANIMAL FUR

This is a continuation of application Ser. No. 948,797, filed Oct. 5, 1978, now abandoned.

This invention relates to a process for treating feather or animal fur.

Feathers of fowl, duck, etc, and fur of animals are mainly composed of keratin, namely hard quality protein, and are quite difficult to dissolve into water, so that it is the actual state of affairs that they have been merely discarded hitherto. Recently, various processes have been proposed for the effective utilization of feather or animal fur from the standpoint of economizing resources. For example, the so-called rendering process which comprises converting feather or animal fur into a feed by treating it with steam in a pressure-resistant vessel at elevated temperature and pressure with continuous stirring has already been put into practice (for example, Japanese Patent Publication No. 18341/1976). There is also disclosed a process which comprises compressing feather or animal fur by means of extruder to give a product of dense quality followed by cutting and swelling it simultaneously [Japanese Patent Kokai (Laid-Open) No. 39573/1977]. However, the former process is disadvantageous in that it takes a long period of time to complete the treatment and a huge-scale equipment must be provided in order to eliminate the unpleasant odor emitted in the course of treatment. The latter process is disadvantageous in that the formation of dense product brings about an unevenness in the interior and exterior temperatures of the dense product which results in a deterioration of quality and digestibility of product and that cutting must be carried out in extruder which complicates the apparatus and elevates the maintenance cost. In other words, there is room for further improvement in both the disclosed processes.

In view of above, the present inventors have conducted extensive studies on the process for treating feather or animal fur and, as the result, have found that, if feather or animal fur is thrown into a pressure-resistant vessel and directly heated under an elevated pressure, without being compressed, by means of saturated steam or superheated steam and then puffed, the feather or animal fur is disintegrated and made readily crushable so that the time period necessary for treatment can be reduced, the after treatments such as drying and cooling can be simplified, a uniform treatment becomes possible, and therefore digestibility or enzyme decomposition of product can be improved as compared with the product of disclosed processes. Based on these findings, this invention has been accomplished.

It is an object of this invention to provide a novel process for treating feather or animal fur.

It is another object of this invention to provide a feed for domestic animals or a nitrogen source fertilizer obtained from feather or animal fur.

Other objects and advantages of this invention will be apparent from the descriptions given below.

According to this invention, there is provided a process for treating feather or animal fur characterized by throwing feather or animal fur into a pressure-resistant vessel, directly heating it under an elevated pressure by means of saturated steam or superheated steam, then rapidly discharging it into atmospheric air to puff said feather or animal fur, and drying and cooling it if necessary.

The accompanying drawing illustrates the disclosed continuous explosive puffing apparatus used in this invention, wherein 1 is inlet for raw material, 2 is charging rotary valve, 3 is pressure-resistant vessel, 4 is belt conveyor, 5 is steam inlet hole, 6 is discharging rotary valve, 7 is steam outlet hole, and 8 is product discharging hole.

This invention will be illustrated below more concretely.

The feather of fowl, duck, etc. arising in poultry farms or meat-processing factories or the animal fur such as waste wool arising in spinning-mills is thrown into a pressure-resistant vessel either directly or after being washed with water, where it is then heated under an elevated pressure by means of saturated steam or superheated steam. Although the feather or animal fur may be heat-treated under elevated pressure in any state of dryness or wetness, it is desirable to carry out the treatment in dryness from the viewpoint utilizing the steam more effectively. Particularly when the steam is a superheated steam, it is desirable to carry out the treatment after feather or animal fur has previously been dried nearly to the state of air-dryness, namely to an approximate water content of 10%.

When the treatment is carried out with saturated steam, pressure of steam is 2 kg/cm$^2$ G or above, preferably 4 to 8 kg/cm$^2$ G. When the treatment is carried out with superheated steam, the steam has a pressure of 2 kg/cm$^2$ G or above and a temperature of 150° C. or above, preferably a pressure of 4 to 6 kg/cm$^2$ G and a temperature of 180° to 240° C. The treatment is carried out for a time period of 30 seconds to 10 minutes. If the temperature or pressure of treatment is lower than the ranges specified above, the decomposition and puffing of feather or animal fur becomes insufficient. If pressure of the treatment is higher than the range specified above, the time period necessary for the treatment can be reduced but the apparatus for the treatment should be worked under more strictly regulated conditions, which is undesirable. Therefore, the treatment is preferably carried out in the pressure range specified above.

Disclosed pressure-resistant vessles may be used for the heat-treatment under elevated pressure under the above-mentioned conditions. For example, the explosive puffing apparatus shown in the accompanying drawing is advantageous in that it enables a continuous treatment. Now, the process of this invention will be illustrated by referring to the accompanying drawing. A raw material to be treated such as feather or animal fur is thrown into pressure-resistant vessel 3 from the raw material inlet 1 by means of rotary valve 2. It is then transferred by means of belt conveyor 4, during which it is heated under an elevated pressure by the steam introduced from steam inlet hole 5. Then it is discharged into the atmospheric air by means of discharging rotary valve 6. Since the inner space of the pressure-resistant vessel is kept at an appointed pressure by the steam introduced thereinto, the puffing of feather or animal fur takes place just at the instance that it is discharged from the discharging rotary valve. The feather or animal fur thus puffed has already been disintegrated and become readily crushable, so that it can be dried and cooled quite readily and made into powder without difficulty by use of a simple crusher or the like.

The puffed feather or animal fur thus obtained can be utilized as a feed for domestic animals as it is or after being blended with other feeds. Also, it may be buried into soil to utilize it as a nitrogen source fertilizer. The process of this invention emits unpleasant odor only in a quite limited quantity owing to the short time period which it takes, so that the installation for eliminating the odor may naturally be small-sized. Moreover, the process of this invention makes a cutting treatment unnecessary because the product can directly be treated without compression. Further, according to the process of this invention, a feather powder of any desired decomposition rate can be obtained without difficulty merely by varying the conditions of heating. This makes us expect the possibility that feather or animal fur of which use has hitherto been limited to feed and fertilizer may find many other uses such as foods. The examples of this invention will be mentioned below.

EXAMPLE 1

The wet feather collected from slaughter house of fowl was air-dried and then heated under pressure for 2 to 8 minutes with saturated steam having a pressure of 4 to 6 kg/cm² G in a batch explosive puffing apparatus, after which the pressure was rapidly released to puff the feather. After being cooled and dried, the puffed feather thus obtained was so readily crushable that it could be crushed with fingers. In vitro digestibility (Note 1) of this product was as shown in Table 1.

TABLE 1

| Heating time (minutes) | In vitro digestibility (%) Pressure | |
|---|---|---|
| | 4 kg/cm² G | 6 kg/cm² G |
| 2 | 89.0 | 90.0 |
| 4 | 89.5 | 91.0 |
| 6 | 90.6 | 92.3 |
| 8 | 91.6 | 93.6 |

(Note 1)
In vitro digestibility was measured by the method of Wedemeyer (cf. "Shiryogaku Kogi", published by Yokendo). Thus, 2 g of sample previously defatted with ether was placed in a flask having a capacity of 1 liter, to which were added 1 g of pepsin, 480 ml of water and 10 ml of 25% hydrochloric acid. The flask was stoppered with rubber and kept at 37° C. for 24 hours. Then an additional 10 ml of 25% hydrochloric acid was added and the flask was allowed to stand for 24 hours. Subsequently, the mixture was filtered and nitrogen content of the precipitate was determined by Kjeldahl method, which was the quantity of pepsin-indigestible nitrogen. In vitro digestibility was calculated according to the following equation:
In vitro digestibility (%) =

$$\left(1 - \frac{\text{pepsin-indigestible nitrogen in sample}}{\text{total nitrogen in sample}}\right) \times 100$$

EXAMPLE 2

Using the continuous explosive puffing apparatus shown in the accompanying drawing, the same feather as used in Example 1 was heated at elevated pressure by means of a superheated steam having a pressure of 6 kg/cm² G and a temperature of 240° C., where the residence time of the feather in the apparatus was 8 minutes. After the heat-treatment under the pressure, the feather was puffed. The puffed feather thus obtained was quite easy to crush and its in vitro digestibility was as high as 94.2%.

EXAMPLE 3

A waste wool arising in a spinning-mill was thrown into a batch explosive puffing apparatus and heated under elevated pressure for 6 minutes by means of a saturated steam having a pressure of 4 kg/cm² G. Then, the pressure was rapidly released to puff the wool. The puffed waste wool thus obtained was mixed with a test soil (Note 2) and cultivated at a constant temperature of 30° C. As shown in Table 2, the content of inorganic nitrogen in soil (Note 3) useful for the production of crops could be increased by this procedure as compared with the soil mixed with an untreated waste wool. It is understandable from this result that the puffed waste wool is easy to get decomposed in soil and utilizable as a nitrogen source fertilizer effectively.

TABLE 2

| Conditions of cultivation | Inorganic nitrogen content of soil sample (mg/g-sample) | |
|---|---|---|
| | Untreated | Puffed |
| 30° C., 1 day | 0.294 | 0.765 |
| 30° C., 14 days | 7.515 | 15.335 |

(Note 2)
Composition of the sample soil:
Air-dried field soil (32 mesh or below) 54.6% by wt.
Siliceous sand (50–30 mesh) 18.2% by wt.
Puffed or untreated waste wool 3.0% by wt.
Water 24.2% by wt.
(Note 3)
Inorganic nitrogen: It was measured by the method of Bremner mentioned in "Dojo Yobun Bunsekiho" edited by the Soil Nutrition Measurement Committee, Japan, and published by Yokendo. Thus, a sample soil after cultivation was mixed with 100 ml of 2 N potassium chloride solution in a flask stoppered with rubber and shaken for 1 hour for the sake of extraction, after which the flask was left standing. 20 ml of the supernatant was mixed with 0.2 g of magnesium oxide and 0.2 g of powdered Devarda's alloy and steam distilled. The distillate was collected in a 2% solution of boric acid and titrated with N/20 H₂SO₄, from which the quanity of total inorganic nitrogen was determined.

EXAMPLE 4

Using the apparatus shown in the accompanying drawing, the same feather as used in Example 1 was continuously heat-treated under elevated pressure for 10 minutes by means of a saturated steam having a pressure of 6 kg/cm² G, after which the pressure was rapidly released to puff the feather. It was cooled, dried and then crushed to obtain a feather meal. Its analyses were as shown in Table 3.

For comparison, commercial feather meal produced by the rendering process according to which a feather is heat-treated under elevated pressure with a high pressure steam but it is not subjected to puffing treatment was also analyzed. The results were as shown in Table 3.

TABLE 3

| | Product of the process of this invention | Commercial product of rendering process |
|---|---|---|
| Total nitrogen (%) | 15.2 | 14.0 |
| Crude protein (%) | 95.0 | 87.5 |
| In vitro digestibility (%) | 95.4 | 84.4 |
| Crude ash (%) | 1.5 | 1.5 |
| Water (%) | 6.1 | 5.6 |

The results of Table 3 clearly demonstrate that the feather meal produced according to the process of this invention is so much as 9% higher than the commercial feather meal in in vitro digestibility.

What is claimed is:

1. A process for treating animal feathers or animal fur which comprises feeding uncompressed animal feathers or animal fur into a pressure-resistant vessel, directly heating it for 2 to 10 minutes under an elevated pressure in the presence of a saturated steam of 4–8 Kg/cm² G or a superheated steam of 4–6 Kg/cm² G at a temperature of 180°–240° C., then rapidly discharging it into an atmosphere of lower pressure to instantaneously puff-explode said animal feathers or animal fur.

2. A process according to claim 1, wherein said animal feathers or animal fur is taken from one member selected from the group consisting of feather of fowl, feather of duck and wool.

* * * * *